United States Patent Office 2,694,129
Patented Nov. 9, 1954

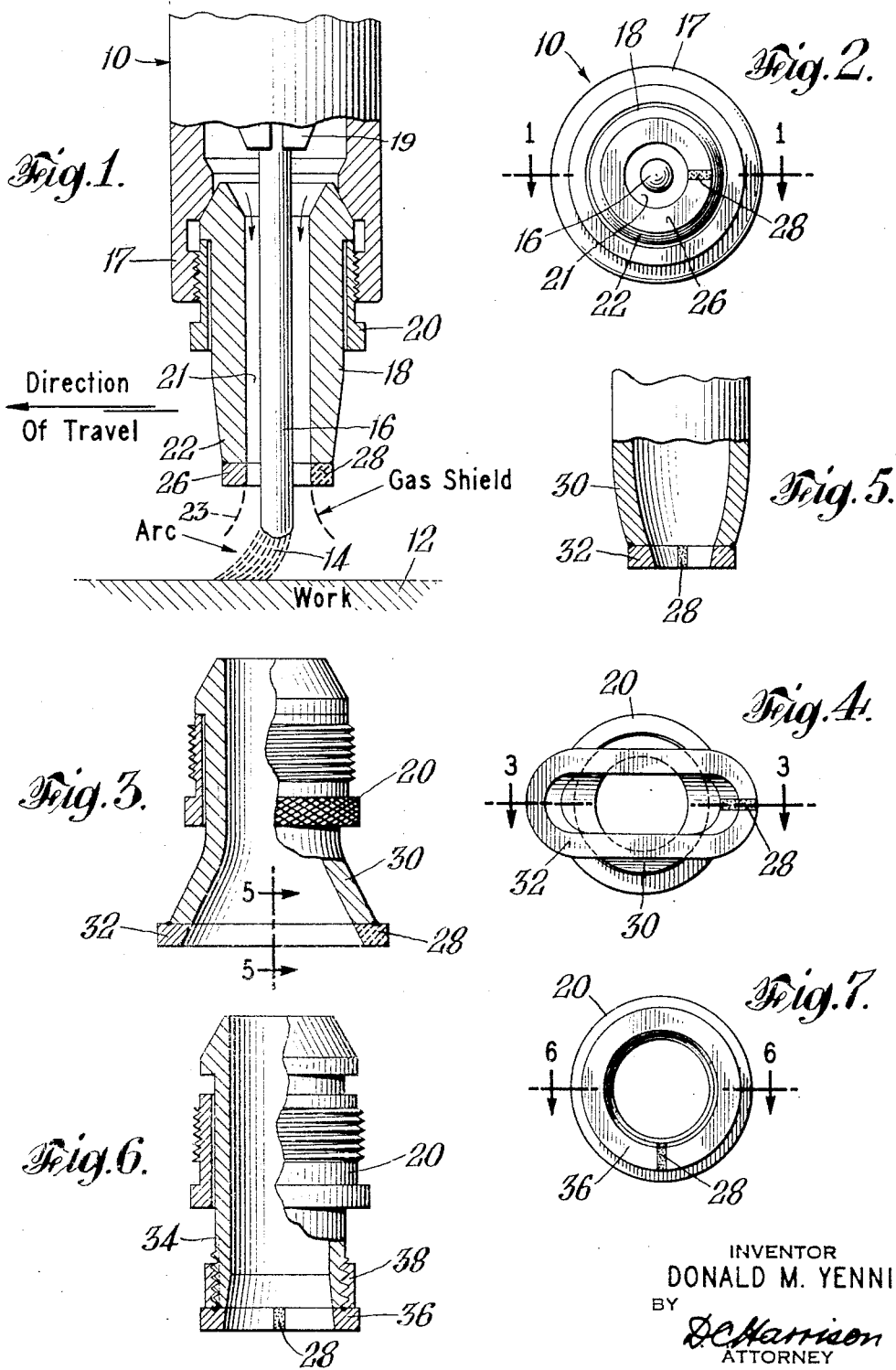

2,694,129

SELF-INDUCED MAGNETIC FIELD CONTROLLED GAS SHIELDED-ARC WELDING PROCESS AND APPARATUS

Donald M. Yenni, Williamsville, N. Y., assignor to Union Carbide and Carbon Corporation, a corporation of New York Application March 7, 1951, Serial No. 214,343

14 Claims. (Cl. 219—8)

This invention relates to electric arc heating, and more particularly to magnetic field controlled gas-shielded metal-arc welding.

In order to increase the speed of such welding, it has been proposed to direct the arc with a leading component by an open magnet arranged so that the poles thereof are disposed at opposite sides of the arc to provide a transverse field which deflects the arc in a forwardly inclined direction. However, such proposal has several disadvantages. For example, permanent magnets are subject to aging, i. e., weakening of the field with time, which is accelerated by the elevated temperature to which they are exposed in use. Furthermore, the north and south poles thereof must be adjusted (to reverse the direction of the field) for straight-polarity and for direct-polarity arc welding; and permanent magnets are not suitable for alternating current arc welding. In addition, good permanent magnets are relatively expensive.

The main object of this invention, therefore, is to provide an improved method of and means for directing and stabilizing a metal heating-electric arc. Another object is to provide a magnetic-field controlled gas-shielded arc welding torch which is simple and economical in its parts, relatively easy to fabricate, and efficient and effective in use. A further object is to provide an improved process of metal-arc welding. Other objects will appear from the following description of the invention.

According to the invention, arc orientation control is achieved by a split magnetic induction ring disposed at the outlet rim of an arc shielding-gas cup with the magnetic gap thereof located behind the arc to provide an induced magnetic field from the arc current. Such split magnetic ring is preferably made a part of the gas cup. The resulting split magnetic ring-gas cup has the desirable properties of ease of fabrication; universal application to reverse and straight polarity-direct current arcs, and to alternating current arcs; infinite storage life; satisfactory performance at elevated temperature; and relatively low cost.

The induced magnetic field provided by the split magnetic ring results in a remarkable improvement in the maximum speed of welding thin stainless steel with helium and with argon gas shielding, and increases the applications of argon gas shielding. The split magnetic ring may be composed of material which is either temporarily or permanetly magnetizable according to the invention.

In the drawing:

Fig. 1 is a fragmentary view mainly in vertical section of a welding torch in use illustrating the invention;

Fig. 2 is a bottom plan view of such torch;

Fig. 3 is a fragmentary view in side elevation, portions being broken away and shown in section, taken on line 3—3 of Fig. 4, of an oval gas cup modification of the invention;

Fig. 4 is a bottom plan view thereof;

Fig. 5 is a fragmentary view in side elevation of such cup, with a portion broken away and shown in section taken on line 5—5 of Fig. 3;

Fig. 6 is a view partly in section taken on line 6—6 of Fig. 7, and partly in side elevation of another cylindrical cup modification; and Fig. 7 is a bottom plan view of the latter.

As shown in Figs. 1-3, a gas shielded-arc welding torch 10 is positioned above metal work 12 (the torch-to-work distance being exaggerated) to provide an arc 14 under an electrode 16 which is in a welding current circuit with such work. The torch 10 comprises a tubular body 17 and a cup 18 which is secured in place on the lower end of such body by a nut 20. The body 17 is provided with conventional means 19 supporting the electrode in axial relationship therewith. The cup 18 is annularly spaced from the electrode 16 to provide an annular passage 21 for a shielding gas stream 23 which flows downwardly from the interior of the body 17, longitudinally in the passage 21 between the cup 18 and electrode, and out of the cup, over the work 12, about the arc 14, protecting the welding zone from atmospheric contamination during the welding operation, as the work and torch are moved relatively one to the other in the direction of the weld.

The electrode 16 may be composed of a refractory metal such as tungsten, or a consumable metal similar to that of the work metal. In case the electrode is composed of magnetic material, it is preferably demagnetized before entering the ring, by passing it through an A. C. coil for example. The gas may be any suitable shielding gas, preferably an inert monatomic-gas such as argon or helium, or mixtures thereof.

The illustrated cup 18 is composed of non-magnetic material, or metal, such as copper, having a cylindrical nozzle 22 provided with a split magnetic ring 26 having a gap filled with non-magnetic material or metal 28, the ring being silver-soldered in place on the end of the cup. The body of the ring 26 may be soft iron, or steel, or a permanent magnet, or combinations thereof. In order to obtain either higher permeability, or higher saturation-level, other examples of materials of which the ring may be made are alloys that improve the magnetic field strength, such as cobalt or iron-nickel and iron-silicon alloys.

The flux density induced by a given current and measured at a point in space is dependent on the permeability of the surrounding medium. Accordingly, when the split magnetic ring 26 is composed of highly permeable material such as soft-iron, for example, the welding arc current flowing through electrode 16 induces in such ring a magnetic field, transforming the soft iron ring into a relatively strong magnet.

In operation, work 12 and electrode 16 are connected in a suitable welding current circuit and arc 14 is struck. At the same time stream 23 of shielding gas is discharged from the cup 18 about the arc and over the adjacent metal which is fused by the arc. The split magnetic ring is magnetized by the flux surrounding the electrode, due to the welding arc current, and produces an auxiliary field due to the low permeability of the gap at the back of the arc. Such auxiliary field directs the arc forwardly as the torch 10 is moved along the desired welding path at a relatively rapid rate.

The split magnetic ring-gas cup possesses a number of advantages over the prior art. Since the polarity of the ring is determined by arc current direction, and the force directing the arc is the vector product of the current and the field, the direction of arc deflection is not influenced by changes in current direction. Consequently, the split magnetic ring is equally suitable for alternating current and for straight and reverse polarity-direct current without changes in ring position on the gas cup. Other advantages of the split magnetic-ring-gas cup are lower cost of cup fabrication, more ready availability of material, operation at considerably higher temperature than is permissible with permanent magnets (the absolute upper limit of temperature would be the Curie point of the metal used for the ring. This is approximately 1400° F. for soft iron), and infinite storage life.

In certain applications, difficulties may be encountered in securing simultaneously adequate magnetic field strength and gas shielding action with a cylindrical bore, split magnetic ring-gas cup because the geometry of the clamping arrangements and other equipment limit the diameter of the ring. Although the effective magnetic field increases as the ring diameter decreases, inadequate gas shielding is encountered with ring dimensions small enough to allow required gas cup spacing above the surface to be welded. On the other hand, when the ring diameter is increased sufficiently to obtain adequate gas protection, the increased elevation necessary for clearance reduces the magnetic field to an unsatisfactory strength. Such difficulties are overcome by a "fishtail" or oval shaped gas cup 30 with a similarly shaped split magnetic ring 32, Figs. 3-5, yielding sufficient shielding gas protection and ample magnetic field strength for control of arc inclination in the direction of welding. For example, it is possible therewith to butt weld 16-gauge stainless steel at a speed of 75 I. P. M. with a welding current of 350 amperes, DCSP, and a shielding argon flow rate of 15 C. F. H. The "fishtail" gas cup is more effective than the cylindrical type for many machine welding applications.

As shown in Figs. 6 and 7, the cup 34 and split magnetic ring 36 are cylindrical but otherwise like the oval split magnetic-ring cup shown in Figs. 3-5. Since the effective magnetic strength is a function of cup elevation above the work, applications arise where a reduced field may be necessary to avoid excessive arc displacements. This difficulty can be overcome by selecting ring dimensions to yield the maximum magnetic field required under customary operating conditions and by obtaining reduced magnetic fields, when desired, with a cylindrical, soft iron keeper 38 which is threaded on the cup 34. Lateral adjustment of the keeper 38 along the bore on the gas cup 34 changes the strength of the horizontal component of the magnetic field at the welding zone to the desired value.

The magnetic field strength at the arc position is affected chiefly by ring elevation above the work, by ring material, ring air gap, ring wall thickness and ring inside diameter. Considering soft iron rings for flux concentration and normal gas cup elevation, the maximum effective field strength is generated with a relatively short ring constructed to have a 1/16-inch gap, the smallest inside diameter consistent with satisfactory gas protection and cool operation, and the maximum wall thickness permitting satisfactory clearance and observation of welding action.

Considerable improvement in magnetic strength results from substitution of suitable magnetic alloy materials for the soft iron ring and from use of strong permanent ring magnets containing an air gap. It is likely, however, that steel rings will be suitable for most applications. Furthermore, the magnetic alloys and permanent magnets are much more expensive than steel rings and require more careful control of operating conditions for satisfactory performance.

As mentioned previously, higher magnetic strengths can be secured by substituting for the iron ring a magnetic ring of almost equal size and shape. Care must be taken to orient the permanent magnet ring containing a 1/16-inch air gap in proper position with reference to the induced field from the welding current in order to secure vector addition of field components. This relationship is satisfied when the air gap is located behind the electrode and the permanent magnet-north pole is on the left hand looking in the direction of travel, for DCSP welding. If desired a permanent magnet also may be used in conjunction with a split magnetic ring to act as a magnetic booster.

The invention, although simple, makes possible welding at relatively high speed (over 200 inches per minute) which, in turn, saves valuable gas, time and labor.

This application is a continuation-in-part of application Serial No. 192,482, filed October 27, 1950, by J. L. Curtin and myself, now Patent No. 2,666,122, dated January 12, 1954.

I claim:

1. A gas shielded arc torch comprising a tubular body provided with means for supporting an electrode in axial relationship therewith, a gas cup removably mounted on one end of said body to surround such electrode and provide an annular gas discharge passage therewith, said gas cup having a split magnetic induction ring mounted on the gas outlet end thereof, providing a magnetic circuit around the gas outlet end of such cup which is closed except at the point of the split where such magnetic circuit is open for stabilizing and orienting the arc formed between the end of said electrode and work when the torch is in use.

2. A gas shielded arc torch as defined by claim 1, in which the gas cup has a cylindrical gas outlet portion.

3. A gas shielded arc torch as defined by claim 1, in which the gas cup has an oval gas outlet portion.

4. An electric torch comprising a tubular body provided with means for supporting an electrode in axial relationship therewith, a split magnetic induction ring surrounding such electrode, and means supporting said ring near the arc end of the electrode, said ring providing a magnetic circuit around said electrode which is closed except at the split where such circuit is open for stabilizing and orienting the arc formed between the end of said electrode and work when the torch is in use.

5. An electric torch as defined by claim 4, in which said ring supporting means comprises a nozzle composed of non-magnetic material.

6. A gas cup for an electric torch comprising a gas nozzle composed of non-magnetic material, and a split magnetic induction ring mounted on the gas outlet rim of said nozzle.

7. A gas cup as defined by claim 6, in which the ring is composed of soft iron.

8. A gas cup as defined by claim 6, in which the ring is composed of steel.

9. A gas cup as defined by claim 6, in which the ring comprises a permanent magnet.

10. A gas cup as defined by claim 6, in which the nozzle is composed of copper.

11. A gas cup as defined by claim 6 in which the magnetic induction ring is composed of a chromium-cobalt-nickel alloy having a permeability and saturation higher than that of soft iron.

12. The combination with means for maintaining a metal fusing-arc between two electrodes as one is moved relatively to the other, of means energized by the arc current acting to stabilize such arc and deflect the arc toward the direction of such movement, comprising a split magnetic induction ring arranged in spaced relation around one of said electrodes adjacent such arc, and means for adjusting the magnitude of the flux in the gap of such ring including a magnetic keeper, and means supporting said keeper for adjustment with respect to said gap to change the arc deflecting effect of the flux provided by such gap.

13. Self-induced magnetic field controlled means for stabilizing and orienting a metal heating arc with respect to work being heated thereby, which comprises a split induction ring of highly permeable material disposed near the work, an arc current conducting electrode projecting through the interior of said ring, the gap in said ring being disposed laterally of the electrode, whereby the arc is stabilized and biased laterally by the resulting flux field.

14. Process of arc welding in which metal work to be welded and a metal electrode are connected in a welding current circuit, a welding arc is struck between one end of such electrode and the work, characterized by surrounding such electrode near the arc with an annular magnetic induction medium of high permeability having an axial split providing a gap of low permeability located behind such arc, whereby the magnetic field surrounding the arc current transforms such medium of high permeability into a magnet, producing an auxiliary magnetic field back of such arc which deflects the arc away from such gap, and moving the work and electrode one with respect to the other along a path to be welded in the direction in which the arc is so deflected at a relatively rapid rate, progressively fusing the work metal in such path.

References Cited in the file of this patent

UNITED STATES PATENTS

| Number | Name | Date |
| --- | --- | --- |
| 1,740,381 | Weed | Dec. 17, 1929 |
| 1,980,447 | Stine | Nov. 13, 1934 |
| 2,475,183 | Gibson | July 5, 1949 |